3,300,202
VEHICLE SUSPENSION STRUT
David S. Vinton, Peoria, Ill., assignor to Caterpillar Tractor Co., Peoria, Ill., a corporation of California
Filed Feb. 3, 1965, Ser. No. 429,996
4 Claims. (Cl. 267—1)

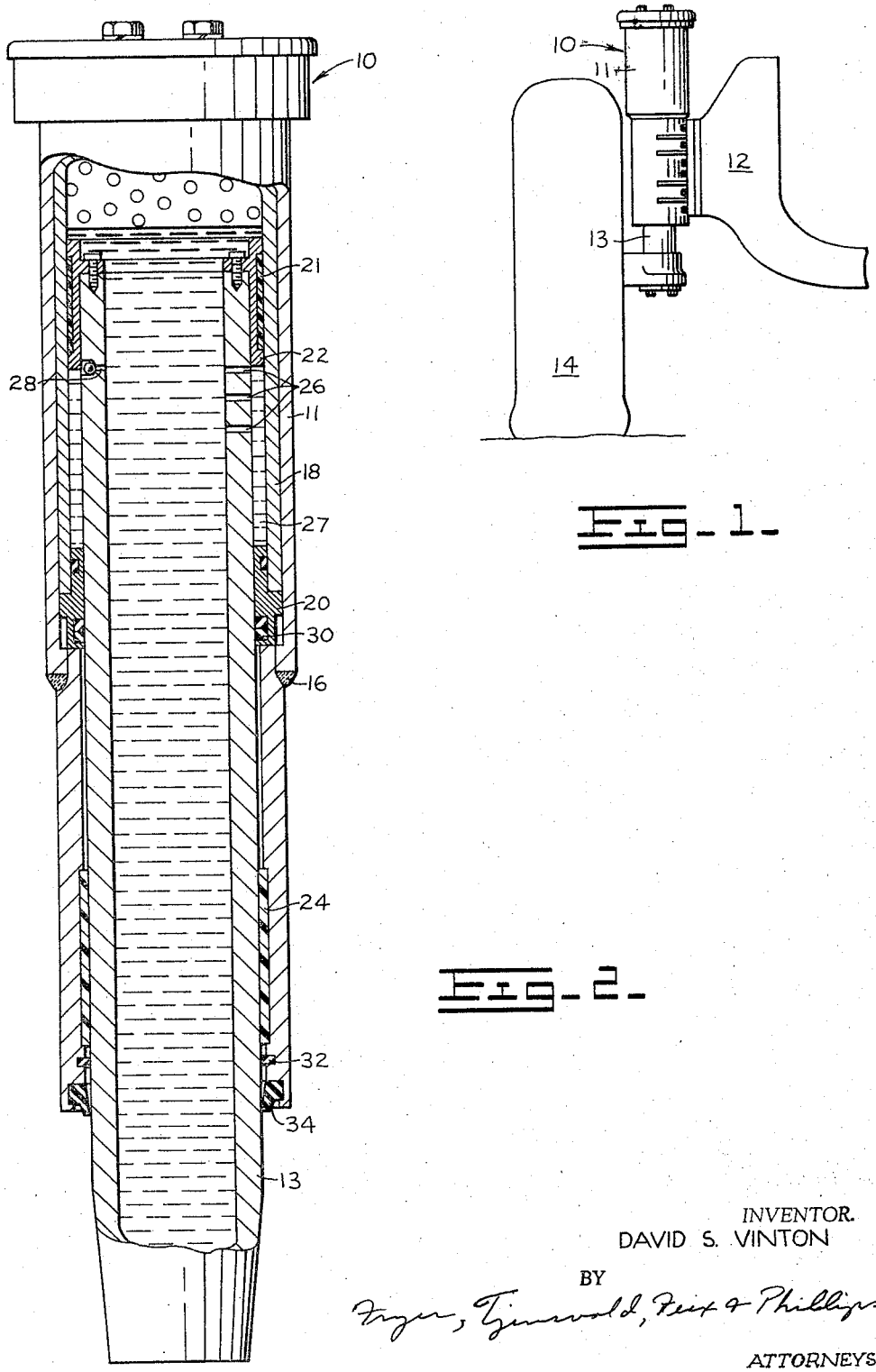

This invention relates to vehicle suspension systems which include telescoping parts and particularly to means for protecting the seals and sealing areas of such parts from contamination by abrasives and other foreign substances.

Many large vehicles employ suspension struts in place of steel springs, resiliency being obtained by the compressibility of gas, and oil serving to damp the shocks. The liquid and gas are confined between telescoping parts fixed one to the vehicle wheel and one with respect to the vehicle body, and it is necessary to provide sealing means to prevent escape of fluids from between the relatively moveable parts. The parts are usually in the form of a piston and cylinder, and it is customary to place a seal in a position to embrace the piston at its point of entry into the cylinder. Consequently, the piston wall engaged by the seal moves into and out of the cylinder and is exposed to contaminants. Since the environment in which such devices are used is in the area of the running gear of a large truck or other vehicle, the abundance of abrasives present causes rapid destruction of the seals, as well as piston surfaces.

It is therefore the object of this invention to provide a suspension device with improved seal means so disposed and arranged that it is protected from the damaging effect of foreign substances. Further and more specific objects and advantages of the invention and the manner in which the invention is carried into practice will be made apparent in the following specification in which reference is made to the accompanying drawing.

In the drawing:

FIG. 1 is a view in elevation of a truck wheel showing a suspension strut between the wheel and a portion of the truck frame; and FIG. 2 is a central vertical sectional view with parts in elevation showing a strut embodying the present invention.

In FIG. 1 the strut, generally indicated at 10, is shown as having a cylinder portion 11 secured to a member 12 which is a part of a vehicle frame. A piston portion 13 of the strut is connected to a wheel 14. Details of construction of the strut are illustrated in FIG. 2, wherein the piston 13 is shown as extending upwardly into the cylinder and enclosing a combination of liquid in the lower portion and gas in the upper portion, both fluids being introduced through suitable openings in the top of the cylinder which is removable and held in place by cap screws, not shown. The cylinder is formed of upper and lower portions welded together as at 16, and the upper portion is larger to provide space for a cylinder liner 18, which is held in place between the top of the cylinder and a seal retainer 20. This liner has inner honed surfaces which makes it unnecessary to hone the interior of the larger cylinder. The upper end of the piston 13 is guided for vertical reciprocal motion in the cylinder by a sleeve of tough plastic material shown at 21, held by a sleeve retainer 22 secured as by cap screws to the upper end of the piston. It is guided adjacent its lower end by similar sleeve 24 retained in a recess machined interiorly of the cylinder.

When weight is applied to the strut, which may be in the form of shock caused by travel of the vehicle over uneven terrain, the cylinder moves downwardly, compressing the gas in the upper end of the strut. Abrupt shock of this downward movement, as well as return movement, is damped by the presence of orifices 26 in the piston wall communicating with a space 27 between the piston and liner. A similar orifice 28 is closed by a check valve preventing transfer of fluid from the space 27 to the interior of the piston, but permitting reverse transfer as the cylinder moves downwardly.

The present invention is directed particularly to means providing a seal against the escape of gas and oil from the interior of the strut, and this seal is in the form of rubber-like rings 30 embracing the smooth exterior surface of the piston and held in the seal retainer 20 about midway between the ends of the cylinder. Similar seals are ordinarily disposed adjacent the end of the cylinder so that reciprocal motion of the piston exposes a portion of the surface against which the seals act. It is the abrasives adhering to this portion which cause destruction of the seals and seal surface of the piston. In accordance with the present invention, the seal 30 is disposed sufficiently far above the lower guide sleeve 24 that that portion of the piston moving downwardly past the seal will never reach the guide sleeve, and is spaced an even greater distance from the lower end of the cylinder.

A small seal shown at 32 embraces the piston adjacent the lower end of the cylinder and a resilient wiper 34 adjacent the extreme lower end of the cylinder embraces the piston to wipe or remove dust or other abrasives which may adhere to it. Consequently, the seal parts, as well as the surface of the piston contacted by such parts, are adequately protected against destructive foreign matter.

I claim:

1. In a suspension strut of the kind which includes a telescoping piston and cylinder containing a compressible fluid, a seal for preventing escape of said fluid, said seal being disposed about midway between the ends of the cylinder to encircle the piston in sliding contact therewith in an area that does not extend beyond the end of the cylinder during normal telescoping movement.

2. The combination of claim 1 with a guide sleeve between the inner end of the piston and the interior of the cylinder, and a guide sleeve between the outer end of the cylinder and the exterior of the piston.

3. The combination of claim 2 in which the telescoping action is limited to a distance which prevents contact between the last named guide sleeve and that area of the piston with which the seal engages.

4. The combination of claim 2 and a wiper element carried by the outer end of the cylinder and encircling the piston in frictional contact therewith.

References Cited by the Examiner
UNITED STATES PATENTS

| | | | |
|---|---|---|---|
| 2,224,306 | 12/1940 | Krueger | 267—64 |
| 3,074,708 | 1/1963 | Lush et al. | 267—64 |
| 3,077,345 | 2/1963 | Anderson et al. | 267—64 |

ARTHUR L. LA POINT, *Primary Examiner.*

R. W. WOHLFARTH, *Assistant Examiner.*